United States Patent
Xu et al.

(10) Patent No.: US 10,061,864 B1
(45) Date of Patent: Aug. 28, 2018

(54) METHOD AND SYSTEM FOR IMPROVING DATACENTER OPERATIONS UTILIZING LAYERED INFORMATION MODEL

(71) Applicant: EMC IP Holding Company LLC, Hopkinton, MA (US)

(72) Inventors: Hao Xu, Shanghai (CN); Chao Chen, Shanghai (CN); John F. Wyatt, Jr., Worcester, MA (US); Mark A. Traietti, Natick, MA (US); Tianqing Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 366 days.

(21) Appl. No.: 14/671,513

(22) Filed: Mar. 27, 2015

(51) Int. Cl.
*G06F 17/30* (2006.01)

(52) U.S. Cl.
CPC .. *G06F 17/30958* (2013.01); *G06F 17/30289* (2013.01)

(58) Field of Classification Search
CPC ............... G06F 17/30958; G06F 17/30289
See application file for complete search history.

(56) References Cited

U.S. PATENT DOCUMENTS

| | | | |
|---|---|---|---|
| 8,878,852 B1* | 11/2014 | Klein | H04L 43/0811 345/440 |
| 9,231,833 B1* | 1/2016 | Bandopadhyay | H04L 41/12 |
| 9,361,139 B1* | 6/2016 | Baig | G06F 9/455 |
| 2011/0029882 A1* | 2/2011 | Jaisinghani | H04L 41/12 715/736 |
| 2014/0038523 A1* | 2/2014 | McGeer | G01S 5/0263 455/41.2 |
| 2014/0222745 A1* | 8/2014 | Deng | G06N 7/005 706/47 |
| 2016/0188427 A1* | 6/2016 | Chandrashekar | G06F 11/2007 714/4.11 |

* cited by examiner

*Primary Examiner* — Tarek Chbouki
(74) *Attorney, Agent, or Firm* — Ryan, Mason & Lewis, LLP

(57) ABSTRACT

Example embodiments of the present invention relate to a method and a system for datacenter management. The method includes retrieving logical relationship information regarding a datacenter and generating a layered information model of the logical relationship information regarding the datacenter. The datacenter then may be managed according to commands received from a datacenter management device configured to navigate the layered information model.

20 Claims, 6 Drawing Sheets

US 10,061,864 B1

METHOD AND SYSTEM FOR IMPROVING DATACENTER OPERATIONS UTILIZING LAYERED INFORMATION MODEL

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage management.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method and a system for datacenter management. The method includes retrieving logical relationship information regarding a datacenter and generating a layered information model of the logical relationship information regarding the datacenter. The datacenter then may be managed according to commands received from a datacenter management device configured to navigate the layered information model.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

A typical data center includes different kinds of hardware, such as servers, racks, switches, and storage arrays, and software from low level management software to operating systems, infrastructure as a service (IaaS) (e.g., OpenStack), hypervisors, virtual networking applications, middleware, databases, and applications. The software and hardware components of datacenters have logical (e.g. topology) relationship consisting of a number of layers, including application, operating system (OS), virtual machine (VM), virtual switch, hypervisor, physical hardware (e.g., CPU, memory, disk), server, network interface card (NIC), physical network, and storage. Further, for data center operators, it can be quite challenging to get the right information from and interact with different management software for a number of reasons: (1) variety: different hardware/software has different management software; (2) complexity: information from different hardware/software is not well organized (e.g., into a unified model); and (3) interaction: the complex information is hard to display and navigate.

Traditional data center management software provides a dashboard that is not context-aware with too much information returned at one time. Accordingly, example embodiments of the present invention provide improved data center operations productivity via integration of wearable (i.e., smart) devices with backend information technology (IT) services by orchestrating existing IT services into a unified information model allowing for more efficient and context-aware information navigation.

Figure 1:
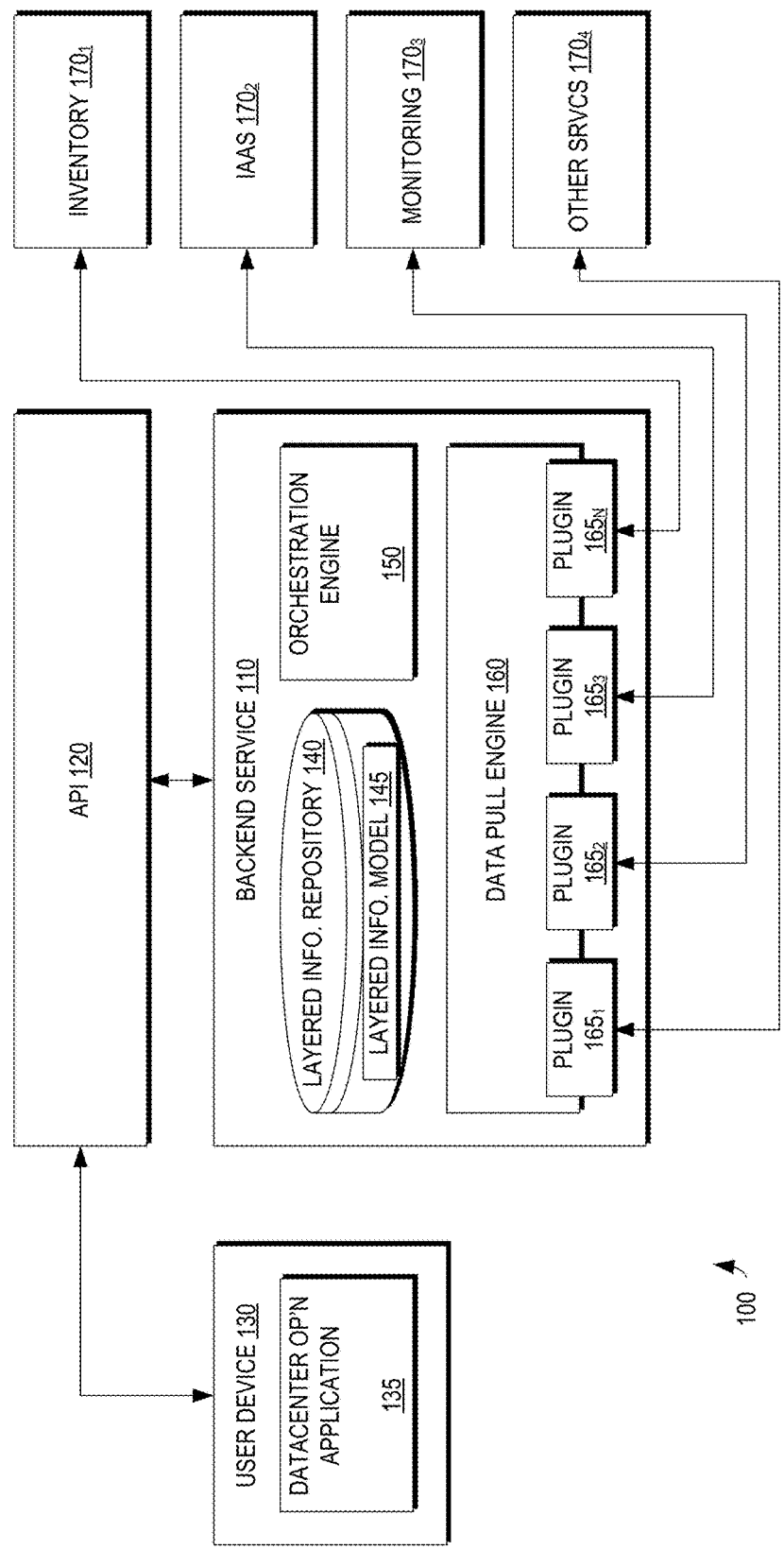
FIG. 1 is block diagram of a system according to an example embodiment of the present invention.

FIG. 1 is a block diagram of a system 100 according to an example embodiment of the present invention. Example embodiments of the present invention provide a pluggable architecture to integrate with different kinds of data center management systems. The pluggable architecture enables the system 100 to pull information from and interact with these existing systems via a layered information model to model data center including a directed graph based on the hardware/software components and their logical connections. Human-machine interaction and presentation methods, such as gesture, voice, and augmented reality, then may be used to interact with and navigate the layered information model.

As illustrated in FIG. 1, the system 100 comprises a backend service 110 accessible via an application programming interface (API) 120 by a user (i.e., management) device 130 operating a data center operations application 135. The backend service 110 may comprise a layered information repository 140, an orchestration engine 150, and a data pull engine 160 having one or more plugins 165$_1$-165$_N$ (165 generally).

In certain embodiments, the data pull engine 160 may provide a pluggable architecture with, for example, a plugin 165 for each kind of IT management system in the datacenter. The plugins 165 may extract logical and physical datacenter component attributes into node type instances with other related information and build relationships between nodes. For example, the system 100 may include plugins 165 to retrieve datacenter component attributes from any layer of the datacenter, including inventory management applications 170$_1$ (i.e., both datacenter component inventor and warehouse stock inventory), IaaS management applications 170$_2$ (e.g., OpenStack® and VMware® vCenter Server®), datacenter monitoring applications 170$_3$ (EMC® SMARTS® and ViPR® SRM), and other data center services 170$_4$ (datacenter services, generally 170).

In certain embodiments, the orchestration engine 150 may follow pre-defined rules to organize datacenter attributes returned from data pull engine 160 and construct a full directed graph of the logical relationships of the hardware and software datacenter components and store the directed graph into the layered information repository 140 as the layered information model 145. The orchestration engine 150 also may periodically synchronize the layered information model 145 according to a current datacenter topology.

In certain embodiments, the layered information repository 140 may store a layered information model 145 comprising a directed graph consisting of datacenter nodes and edges. As understood in the art, a directed graph (or digraph) is an ordered pair D=(V, A) where V is a set whose elements are called nodes or vertices, and A is a set of ordered pairs of vertices called arcs, directed edges, or arrows. As understood in the art, a network node is a logical component of hardware/software having a data structure describing its attributes and operations. For example, a database node may have attributes like tables and connections and operations like start and stop. Therefore, an edge in a directed graph may represent a logical relationship between nodes. For example, in a topological relationship, an application running on an Ubuntu system may be represented by the edge between the application node and the operating system node. For common nodes, an abstract node type may be defined to describe a common component, like a web application or an operating system, and provide attributes and operations. Also new abstract node types may be defined based on system requirements.

In certain embodiments, the user device 130 may be a smartphone, a wearable device (such as Google Glass™ or a smartwatch), or a traditional personal computer. The user device 130 may run a datacenter operation application 135, which may be tailored to the attributes of the user device 130 and to leverage the capabilities of the user device 130, to parse and input and communicate with the backend service 110 via the API 120 and present a result output by the backend service 110 to the user of the user device 130. The user device 130 may provide various types of input including gesture, voice, camera, and traditional human interface device inputs such as keyboard, mouse, and touchpad. The user device 130 may provide various types of output including voice or other audio response, augmented reality, haptic feedback, or any other type of visual response.

Figure 2:
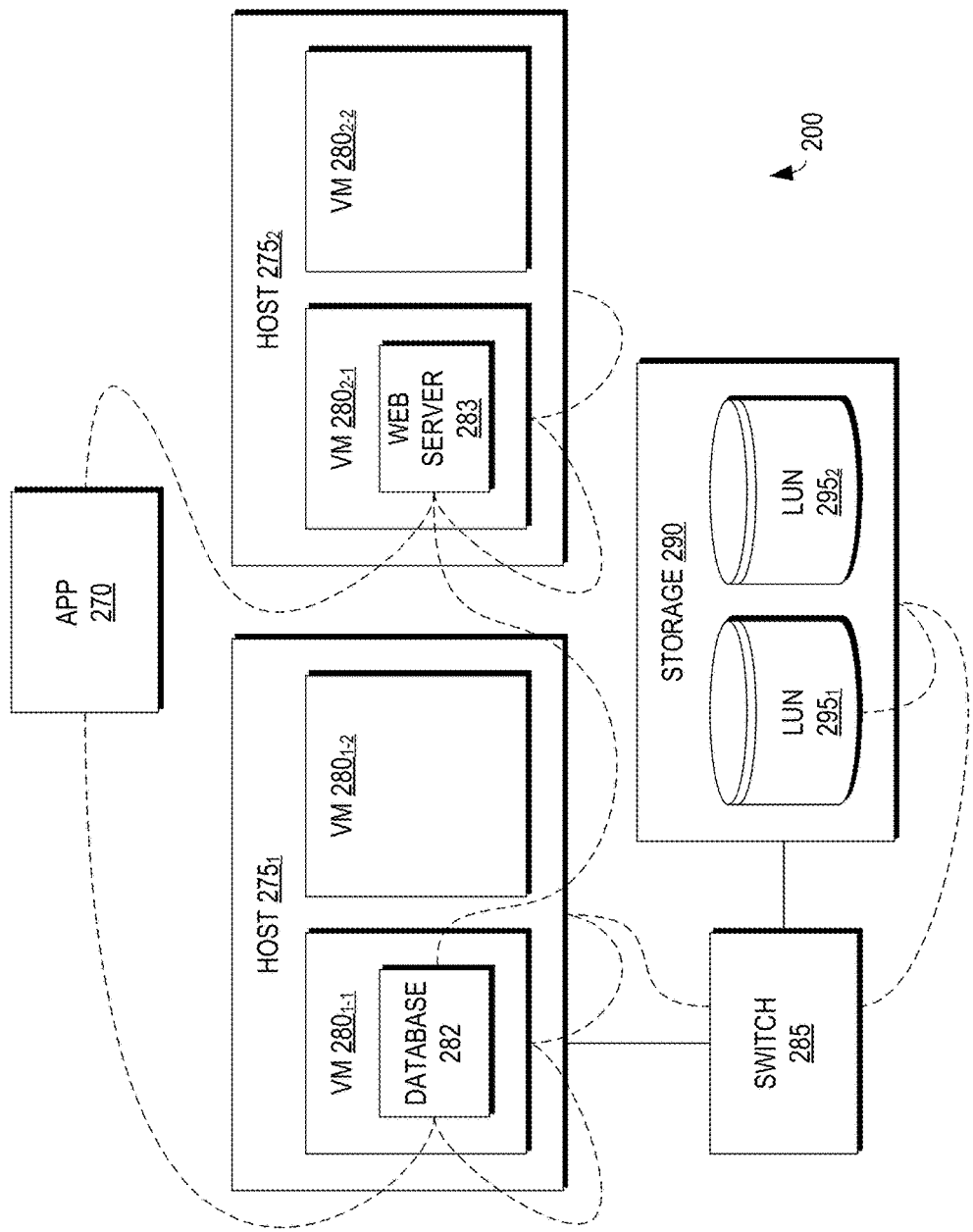
FIG. 2 is a block diagram of a datacenter for management showing physical and logical relationships according to an example embodiment of the present invention.

FIG. 2 is a block diagram of a datacenter 200 for management showing physical and logical relationships according to an example embodiment of the present invention. As illustrated, the datacenter 200 may include a plurality of hosts 275$_1$, 275$_2$ (275 generally) with each host running a hypervisor (not shown) managing a plurality of virtual machines 280$_{1-1}$, 280$_{1-2}$, 280$_{2-1}$, 280$_{2-2}$. One or more of the hosts 275 may be connected via a switch 285 to a storage system 290 providing a plurality of storage units (e.g., LUNS) 295$_1$, 295$_2$.

As illustrated in FIG. 2, an application 270 may be logically connected to a web server 283 running on a first VM 280$_{2-1}$ operating on a second host 275$_2$ in the datacenter 200. The web server 283 may have a logical connection to a backend database 282 operating on a second VM 280$_{1-1}$ operating on a first host 275$_1$ in the datacenter 200. The first host 275$_1$ may be physically connected to the storage system 290 via a switch 285 with the database having a logical connection to a first LUN 295$_1$ provided by the storage system 290.

Figure 3:
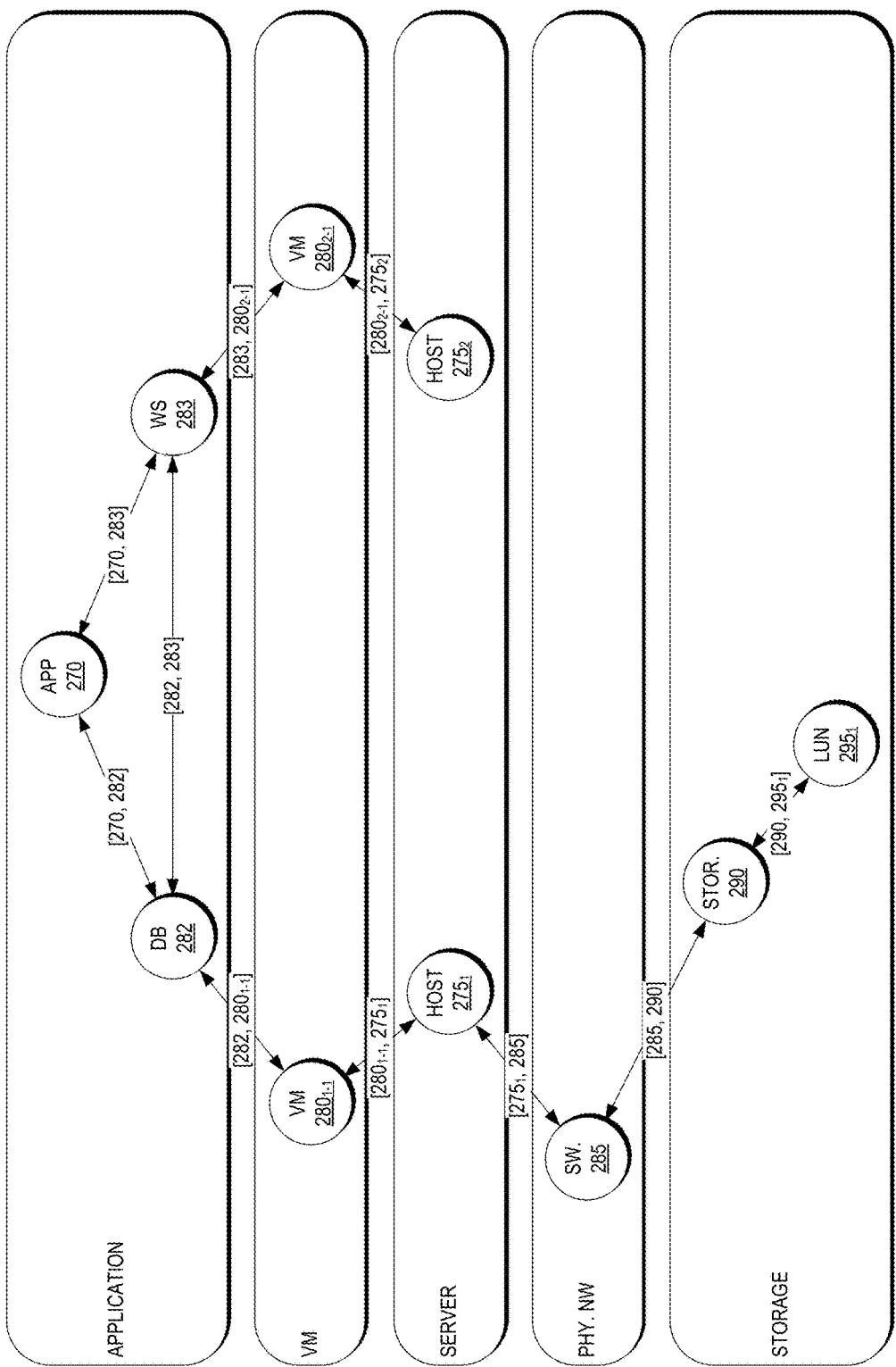
FIG. 3 is a block diagram of a directed acyclic graph of the physical and logical relationships in the datacenter of FIG. 2 according to an example embodiment of the present invention.

FIG. 3 is a block diagram of a directed graph of the physical logical relationships in the datacenter of FIG. 2 according to an example embodiment of the present invention. As illustrated in FIG. 3, the directed graph may include nodes representing the application 270, the database 282, and the web server 283 (in an application layer), with the logical relationships among the application 270, the database 282, and the web server 283 being represented by a plurality of respective edges [270, 282], [270, 283], [282, 283]. As described above, the database 282 and the web server 283 may be running on respective VMs 280$_{1-1}$, 280$_{2-1}$, with those logical relationships represented by respective edges [282, 280$_{1-1}$], [283, 280$_{2-1}$], with the VMs 280$_{1-1}$, 280$_{2-1}$ running on respective hypervisors (not shown) running on respective hosts 275$_1$, 275$_2$ and the physical relationships between respective VMs 280$_{1-1}$, 280$_{2-1}$ and hosts 275$_1$, 275$_2$ being represented by respective edges [280$_{1-1}$, 275$_1$], [280$_{2-1}$, 275$_2$]. Moreover the physical connections between the first host 275$_1$, the switch 285, and the storage system 290 may be represented by respective edges [275$_1$, 285], [285, 290], with the logical relationship between the storage system 290 and the LUN 295$_1$ being represented by an edge [290, 295$_1$].

Referring to FIGS. 1, 2, and 3, in operation, the orchestration engine 150 may initialize the layered information repository 140 by triggering the data pull engine 160 to extract logical datacenter component attributes via the plugins 165 and the datacenter services 170 into node type instances. The orchestration engine 150 then may organize the datacenter attribute nodes returned from the data pull engine 160 into a full directed graph and store the directed graph into the layered information repository 140 as the layered information model 145. The orchestration engine 150 also may periodically perform these operations in the background to update the layered information model 145 according to observed changes to the datacenter topology.

A user, via the user device 130, may provide an input/request to the datacenter operation application 135 regarding an aspect of datacenter operation. The user device 130 may service the input/request, via the API 120, to the backend service 110 which may be handled by the orchestration engine 150. The orchestration engine 150 then may query the layered information repository 140 for results satisfying the input/request. The orchestration engine 150 then may return the results to the datacenter operation application 135 via the API 120 for presentation to the user via the user device 130.

In certain embodiments, the input/request from the user may be a command to perform an action on the datacenter via a datacenter service 170. Therefore, the output/command from the datacenter operation application 135 may be sent by the user device 130 via the API 120 to the backend service 110 and routed by the orchestration engine 150, according to the layered information repository, to the appropriate data pull engine 160 plugin 165. Accordingly, the system 100 may enable orchestration of existing IT services into a unified information model and provide improved datacenter operation productivity.

Figure 4:
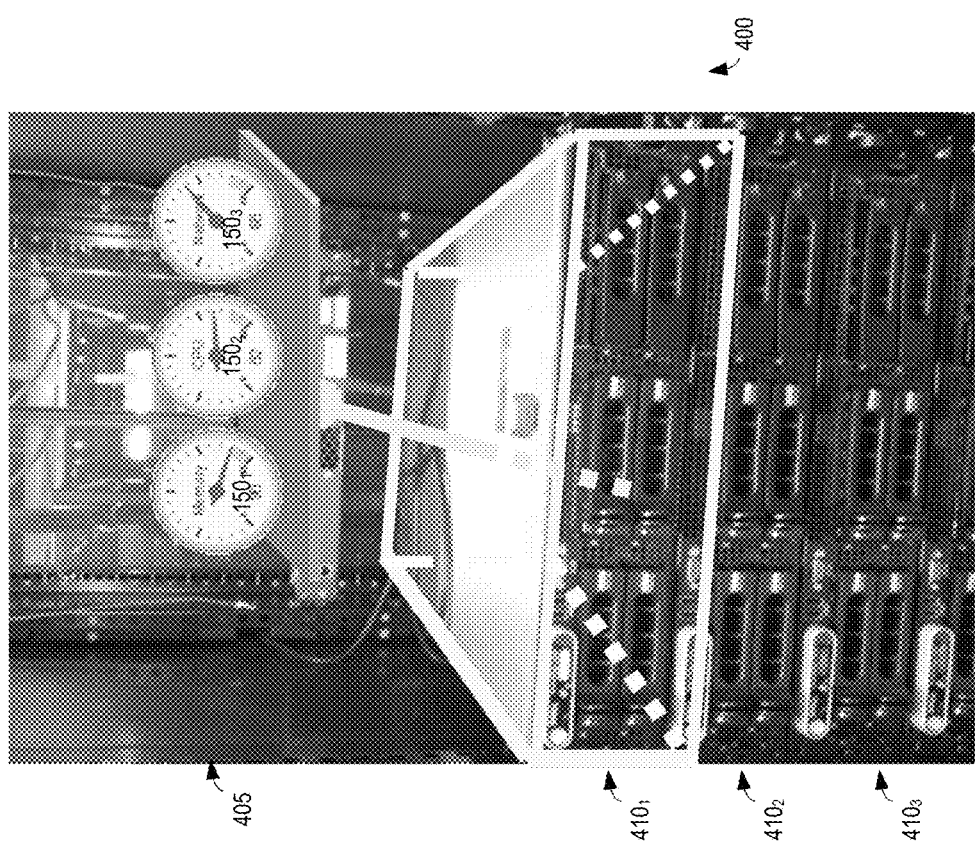
FIG. 4 is a screenshot of a display of a user device according to an example embodiment of the present invention.

FIG. 4 is a screenshot of a display 400 of a user device according to an example embodiment of the present invention. FIG. 4 may be described in conjunction with FIG. 1. As shown in the screenshot, a rack 405 may house a plurality of blade servers $410_1$, $410_2$, $410_3$ (410 generally). A datacenter operation application 135 may connect via an API 120 to a backend service 110 according to an example embodiment of the present invention.

The datacenter operation application 135 may use, for example, spatial recognition or other marks identifiable by the datacenter operation application to identify a particular blade server $410_1$ and submit the identity of the particular blade server $410_1$ to the orchestration engine 150 for identification in the layered information model 145 stored in the layered information repository 140. It should be understood that, in certain embodiments, the layered information model 145 may be built prior to the request for the datacenter operation application 135 or may be created "on the fly" as described above with respect to FIG. 1. As illustrated in FIG. 4, the layered information model 145 may store a directed graph representing the physical and logical relationships between various components in the datacenter, such as the rack, cabling, blade servers, drives, power supplies, memory, CPUs, NICs, hypervisors, and VMs.

The datacenter operation application 135 then may provide feedback to the user regarding attributes of the blade server $410_1$. For example, as illustrated in FIG. 4, the datacenter operation application 135 may display gauges $150_1$, $150_2$, $150_3$ showing blade server utilization metrics, such as memory, CPU, and network. Using the directed graph, the user then may navigate the datacenter (or, here, the rack), by, for example, navigating across the graph to another blade server 410 in the rack 405, navigating up the graph to the rack layer or datacenter layer, or navigating down the graph to the VM layer to view individual VM performance metrics.

Figure 5:
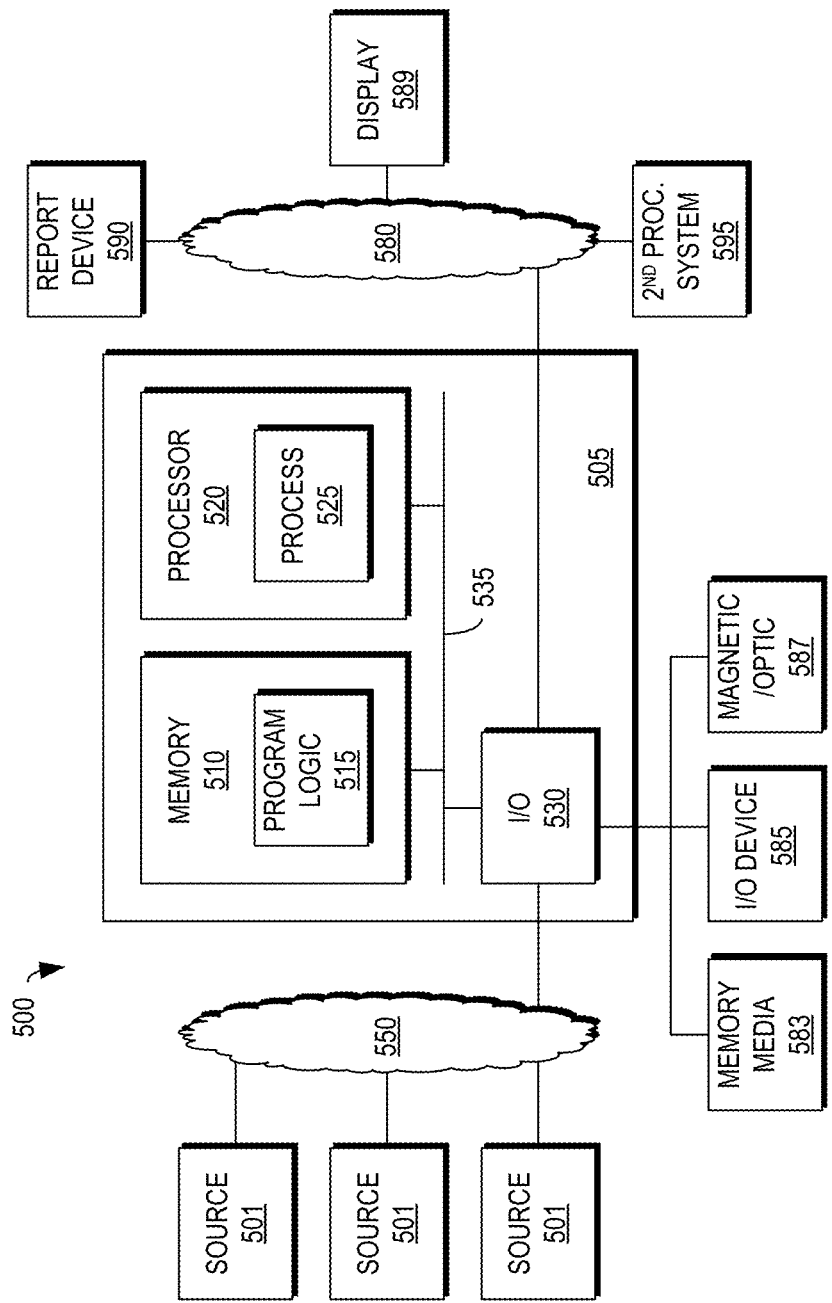
FIG. 5 is a block diagram of an apparatus according to an example embodiment of the present invention.

FIG. 5 is a block diagram of an example embodiment apparatus 505 according to the present invention. The apparatus 505 may be part of a system 500 and includes memory 510 storing program logic 515, a processor 520 for executing a process 525, and a communications I/O interface 530, connected via a bus 535.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 6:
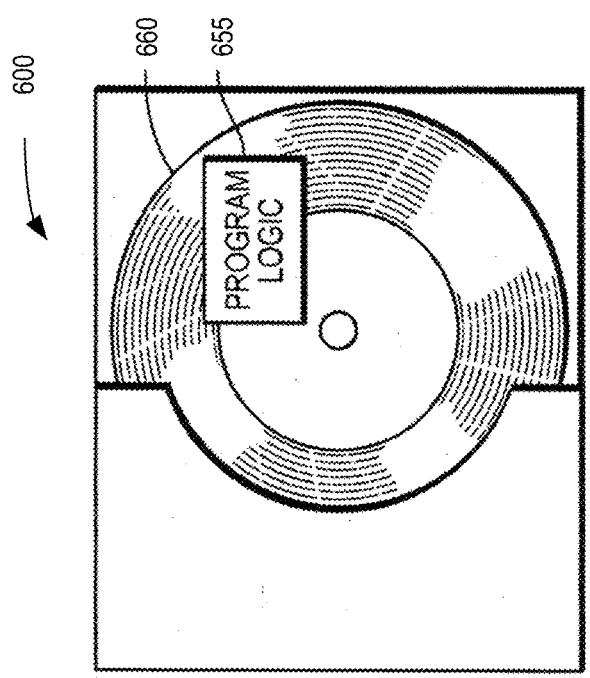
FIG. 6 is a block diagram of an example embodiment of the present invention embodied in computer program code.

FIG. 6 is a block diagram of a computer program product 600 including program logic 655, encoded on a computer-readable medium 660 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:

retrieving logical relationship information regarding a datacenter;

generating a layered information model of the logical relationship information regarding the datacenter, the layered information model comprising a directed graph representing physical and logical relationships between a plurality of components of the datacenter, the directed graph comprising a hierarchy of two or more layers representing respective different types of components in the datacenter; and managing the datacenter according to commands received from a datacenter management device configured to navigate the layered information model;

wherein managing the datacenter comprises:

receiving, at a backend service from the datacenter management device via one or more application programming interfaces, one or more spatial recognition marks for a given component in the datacenter;

identifying, at the backend service, a given layer of the directed graph to which the given component belongs using the one or more spatial recognition marks;

determining, at the backend service using the layered information model, one or more utilization metrics of the given component;

providing, from the backend service to the datacenter management device via the one or more application programming interfaces, the utilization metrics for presentation on a display of the datacenter management device;

providing, from the backend service to the datacenter management device via the one or more application programming interfaces, a first user interface feature for navigating across the given layer of the directed graph to view other components of a same type as the given component; and providing, from the backend service to the datacenter management device via the one or more application programming interfaces, at least a second user interface feature for navigating to one or more layers of the directed graph other than the given layer to view one or more components of a different type than the given component that are related to the given component: and wherein providing the utilization metrics for presentation on the display of the datacenter management device comprises providing one or more gauges based on the utilization metrics for overlay on an augmented reality view of at least a portion of the datacenter.

2. The method of claim 1:

wherein retrieving logical relationship information regarding a datacenter comprises retrieving logical relationship information regarding the datacenter from a plurality of disparate existing datacenter management systems; and wherein generating a layered information model of the logical relationship information regarding the datacenter comprises integrating the logical relationship information from the plurality of disparate existing datacenter management systems.

3. The method of claim 1 further comprising:

arranging the logical relationship information regarding the datacenter into a plurality of logical elements comprising nodes and edges;

wherein generating a layered information model of the logical relationship information regarding the datacenter comprises organizing the plurality of nodes and edges in the directed graph logically representing the datacenter.

4. The method of claim 3 wherein managing the datacenter according to commands received from a datacenter management device configured to navigate the layered information model comprises:

receiving a datacenter operation command regarding a logical element of the layered information model; and forwarding the datacenter operation command to a datacenter service according to the layered information model.

5. The method of claim 4 wherein forwarding the datacenter operation command to a datacenter service according to the layered information model comprises:

identifying the datacenter service according to attributes of the datacenter operation command regarding the logical element of the layered information model; and routing the datacenter operation command to a plugin configured to interface with the identified datacenter service for datacenter management.

6. A method comprising:

receiving attributes of a layered information model of logical relationship information regarding a datacenter from a backend service, the layered information model comprising a directed graph representing physical and logical relationships between a plurality of components of the datacenter, the directed graph comprising a hierarchy of two or more layers representing respective different types of components in the datacenter;

receiving a datacenter management command generated by a user according to navigation of the layered information model; and sending the datacenter management command to the backend service to manage the datacenter;

wherein navigation of the layered information model comprises:

receiving, at the backend service from a datacenter management device via one or more application programming interfaces, one or more spatial recognition marks for a given component in the datacenter;

identifying, at the backend service, a given layer of the directed graph to which the given component belongs using the one or more spatial recognition marks;

determining, at the backend service using the layered information model, one or more utilization metrics of the given component;

providing, from the backend service to the datacenter management device via the one or more application programming interfaces, the utilization metrics for presentation on a display of the datacenter management device;

providing, from the backend service to the datacenter management device via the one or more application programming interfaces, a first user interface feature for navigating across the given layer of the directed graph to view other components of a same type as the given component; and providing, from the backend service to the datacenter management device via the one or more application programming interfaces, at least a second user interface feature for navigating to one or more layers of the directed graph other than the given layer to view one or more components of a different type than the given component that are related to the given component; and wherein providing the utilization metrics for presentation on the display of the datacenter management device comprises providing one or more gauges based on the utilization metrics for overlay on an augmented reality view of at least a portion of the datacenter.

7. The method of claim 6:

wherein receiving a datacenter management command generated by the user according to navigation of the layered information model comprises receiving a datacenter operation command regarding a logical element of the layered information model;

the method further comprising forwarding the datacenter operation command to a datacenter service according to the layered information model for operation on the service in the datacenter.

8. A system comprising:

a backend service comprising:

a data pull engine configured to retrieve logical relationship information regarding a datacenter;

an orchestration engine configured to generate a layered information model of the logical relationship information regarding the datacenter and manage the datacenter, the layered information model comprising a directed graph representing physical and logical relationships between a plurality of components of the datacenter, the directed graph comprising a hierarchy of two or more layers representing respective different types of components in the datacenter; and a user device configured to present attributes of the layered information model to a user and send a datacenter management command generated by the user according to navigation of the layered information model to the backend service to manage the datacenter;
wherein navigation of the layered information model comprises:
receiving, at the backend service from a datacenter management device via one or more application programming interfaces, one or more spatial recognition marks for a given component in the datacenter;
identifying, at the backend service, a given layer of the directed graph to which the given component belongs using the one or more spatial recognition marks;
determining, at the backend service using the layered information model, one or more utilization metrics of the given component;
providing, from the backend service to the datacenter management device via the one or more application programming interfaces, the utilization metrics for presentation on a display of the datacenter management device;
providing, from the backend service to the datacenter management device via the one or more application programming interfaces, a first user interface feature for navigating across the given layer of the directed graph to view other components of a same type as the given component; and
providing, from the backend service to the datacenter management device via the one or more application programming interfaces, at least a second user interface feature for navigating to one or more layers of the directed graph other than the given layer to view one or more components of a different type than the given component that are related to the given component: and
wherein providing the utilization metrics for presentation on the display of the datacenter management device comprises providing one or more gauges based on the utilization metrics for overlay on an augmented reality view of at least a portion of the datacenter; and
wherein the system is implemented using at least one processing device comprising a processor coupled to a memory.

9. The system of claim 8:
wherein the data pull engine is further configured to retrieve logical relationship information regarding the datacenter from a plurality of disparate existing datacenter management systems; and
wherein the orchestration engine is further configured to integrate the logical relationship information from the plurality of disparate existing datacenter management systems.

10. The system of claim 9 wherein the data pull engine is further configured to receive logical relationship information regarding logical datacenter components from a plugin configured to interface with an identified datacenter service for datacenter management.

11. The system of claim 8 wherein the orchestration engine is further configured to arrange the logical relationship information regarding the datacenter into a plurality of logical elements comprising nodes and edges and organize the plurality of nodes and edges in the directed graph logically representing the datacenter.

12. The system of claim 11 wherein the orchestration engine is further configured to receive a datacenter operation command regarding a logical element of the layered information model and forward the datacenter operation command to a datacenter service according to the layered information model.

13. The system of claim 12 wherein the orchestration engine is further configured to identify the datacenter service according to attributes of the datacenter operation command regarding the logical element of the layered information model and route the datacenter operation command to a plugin configured to interface with the identified datacenter service for datacenter management.

14. The system of claim 8 wherein the user device is further configured to receive a navigation command to navigate a directed graph comprising the layered information model to a logical element of the layered information model and receive attribute information regarding the logical element of the layered information model.

15. The system of claim 8:
wherein the user device is further configured to receive a datacenter operation command regarding a logical element of the layered information model; and
wherein the orchestration engine is further configured to forward the datacenter operation command to a datacenter service according to the layered information model for operation on the service in the datacenter.

16. A computer program product including a non-transitory computer readable medium having computer program code encoded thereon comprising:
computer program code for retrieving logical relationship information regarding a datacenter;
computer program code for generating a layered information model of the logical relationship information regarding the datacenter, the layered information model comprising a directed graph representing physical and logical relationships between a plurality of components of the datacenter, the directed graph comprising a hierarchy of two or more layers representing respective different types of components in the datacenter; and
computer program code for managing the datacenter according to commands received from a datacenter management device configured to navigate the layered information model;
wherein managing the datacenter comprises:
receiving, at a backend service from the datacenter management device via one or more application programming interfaces, one or more spatial recognition marks for a given component in the datacenter;
identifying, at the backend service, a given layer of the directed graph to which the given component belongs using the one or more spatial recognition marks;
determining, at the backend service using the layered information model, one or more utilization metrics of the given component;
providing, from the backend service to the datacenter management device via the one or more application programming interfaces, the utilization metrics for presentation on a display of the datacenter management device;
providing, from the backend service to the datacenter management device via the one or more application programming interfaces, a first user interface feature for navigating across the given layer of the directed graph to view other components of a same type as the given component; and providing, from the backend service to the datacenter management device via the one or more application programming interfaces, at least a second user interface feature for navigating to one or more layers of the directed graph other than the given layer to view one or more components of a different type than the given component that are related to the given component; and wherein providing the utilization metrics for presentation on the display of the datacenter management device comprises providing one or more gauges based on the utilization metrics for overlay on an augmented reality view of at least a portion of the datacenter.

17. The computer program product of claim 16:

wherein retrieving logical relationship information regarding a datacenter comprises retrieving logical relationship information regarding the datacenter from a plurality of disparate existing datacenter management systems; and wherein generating a layered information model of the logical relationship information regarding the datacenter comprises integrating the logical relationship information from the plurality of disparate existing datacenter management systems.

18. The computer program product of claim 17 wherein retrieving logical relationship information regarding a datacenter further comprises receiving logical relationship information regarding logical datacenter components from a plugin configured to interface with an identified datacenter service for datacenter management.

19. A computer program product including a non-transitory computer readable medium having computer program code encoded thereon comprising:

computer program code for receiving attributes of a layered information model of logical relationship information regarding a datacenter from a backend service, the layered information model comprising a directed graph representing physical and logical relationships between a plurality of components of the datacenter, the directed graph comprising a hierarchy of two or more layers representing respective different types of components in the datacenter;

computer program code for receiving a datacenter management command generated by the user according to navigation of the layered information model; and computer program code for sending the datacenter management command to the backend service to manage the datacenter;

wherein navigation of the layered information model comprises:

receiving, at the backend service from a datacenter management device via one or more application programming interfaces, one or more spatial recognition marks for a given component in the datacenter;

identifying, at the backend service, a given layer of the directed graph to which the given component belongs using the one or more spatial recognition marks;

determining, at the backend service using the layered information model, one or more utilization metrics of the given component;

providing, from the backend service to the datacenter management device via the one or more application programming interfaces, the utilization metrics for presentation on a display of the datacenter management device;

providing, from the backend service to the datacenter management device via the one or more application programming interfaces, a first user interface feature for navigating across the given layer of the directed graph to view other components of a same type as the given component; and providing, from the backend service to the datacenter management device via the one or more application programming interfaces, at least a second user interface feature for navigating to one or more layers of the directed graph other than the given layer to view one or more components of a different type than the given component that are related to the given component; and wherein providing the utilization metrics for presentation on the display of the datacenter management device comprises providing one or more gauges based on the utilization metrics for overlay on an augmented reality view of at least a portion of the datacenter.

20. The computer program product of claim 19:

wherein receiving a datacenter management command generated by the user according to navigation of the layered information model comprises receiving a datacenter operation command regarding a logical element of the layered information model; and further comprising computer program code for forwarding the datacenter operation command to a datacenter service according to the layered information model for operation on the service in the datacenter.

\* \* \* \* \*